(12) United States Patent
Fan et al.

(10) Patent No.: US 8,803,847 B2
(45) Date of Patent: Aug. 12, 2014

(54) TOUCH DISPLAY DEVICE

(75) Inventors: Fu-Cheng Fan, Hsin-Chu (TW); Tzu-Ling Niu, Hsin-Chu (TW); Yu-Ping Wu, Hsin-Chu (TW); Hsing-Jung Chuang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 350 days.

(21) Appl. No.: 13/151,278

(22) Filed: Jun. 2, 2011

(65) Prior Publication Data

US 2012/0133598 A1  May 31, 2012

(30) Foreign Application Priority Data

Nov. 29, 2010  (TW) .............................. 99141241 A

(51) Int. Cl.
*G06F 3/042* (2006.01)

(52) U.S. Cl.
USPC .......................................... 345/175; 345/176

(58) Field of Classification Search
CPC ................ G06F 3/0421; G06F 3/0423; G06F 2203/04109
USPC ................................................. 345/173–182
See application file for complete search history.

(56) References Cited

U.S. PATENT DOCUMENTS

| 6,538,644 | B1* | 3/2003 | Muraoka ........................ 345/175 |
| 2009/0161051 | A1 | 6/2009 | Fukunaga et al. |
| 2011/0050646 | A1* | 3/2011 | Teng et al. ..................... 345/175 |
| 2011/0261584 | A1* | 10/2011 | Boyd et al. ..................... 362/607 |
| 2012/0013577 | A1* | 1/2012 | Lin ................................ 345/175 |

FOREIGN PATENT DOCUMENTS

| JP | 2002116428 | 4/2002 |
| JP | 2003029260 | 1/2003 |
| JP | 2004117452 | 4/2004 |
| JP | 2006221922 | 8/2006 |
| JP | 2008186374 | 8/2008 |
| TW | I274827 | 3/2007 |
| TW | 200933557 | 8/2009 |
| TW | 200937266 | 9/2009 |
| TW | 201025100 | 7/2010 |

* cited by examiner

*Primary Examiner* — Kevin M Nguyen
*Assistant Examiner* — Kenneth B Lee, Jr.
(74) *Attorney, Agent, or Firm* — Winston Hsu; Scott Margo

(57) ABSTRACT

A touch display device includes a display panel, a light guide plate, at least an invisible light emitting device, and a first light path converting device. The light guide plate includes a plurality of microstructures to reflect an invisible light generated by the invisible light emitting device such that the invisible light passes through the display panel, reaching the first light path converting device.

20 Claims, 17 Drawing Sheets

TOUCH DISPLAY DEVICE

BACKGROUND

1. Technical Field

The disclosure relates to a touch display device, and more particular, to a touch display device having high touch resolution and high light utilization efficiency.

2. Description of the Prior Art

In varieties of modern consumer electronic products, portable electrical products such as flat computers, personal digital assistances (PDAs), mobile phones, global positioning systems (GPSs), audio players, etc. have widely utilized touch panels as human-machine interfaces in order to reduce volumes of the electronic products.

Based on different working mechanisms, touch display devices are mainly classified as: capacitive touch display devices, resistive touch display devices, and optical touch display devices. The optical touch display devices have been widely used because of high transparency. However, in the optical touch display devices, light emitting devices and photo-sensing devices are required to be disposed so as to provide touch-sensing functions. Therefore, the width and thickness of the frame regions of conventional optical touch display devices would be increased. Also, a large number of the light emitting devices are required in each conventional optical touch display device due to its poor light utilization efficiency. As a result, fabrication costs and power consumptions tend to increase, which retards the development of the optical touch display devices.

SUMMARY

It is therefore one of the objectives of the present invention to provide a touch display device having high touch resolution and high light utilization efficiency.

In accordance with an embodiment of the present invention, the touch display device includes a display panel, a light guide plate, at least one invisible light emitting device, and a first light path converting device. The display panel includes a light incident plane and a light exit plane, and the light exit plane of the display panel includes a first side and a second side. The light guide plate faces the light incident plane of the display panel, and the light guide plate includes a first side and a second side. In addition, the first side and the second side of the light guide plate correspond to the first side and the second side of the display panel respectively, so that the first side and the second side of the light guide plate are respectively located on the same sides as the first side and the second side of the display panel. Also, the light guide plate further includes a plurality of microstructures disposed on at least the first side and the second side. The invisible light emitting device is disposed on at least one side of the light guide plate to emit an invisible light toward the light guide plate. The first light path converting device is disposed on the light exit plane of the display panel and arranged along the first side and the second side of the light exit plane of the display panel. The invisible light emitted from the invisible light emitting device travels along the first side and the second side of the light guide plate, and the invisible light is guided toward the light incident plane by the microstructures and penetrates through the display panel so as to reach the first light path converting device.

The touch display device utilizes the microstructures of the light guide plate to upwardly extract the invisible light emitted from the invisible emitting device out of the light guide plate, and then the light path converting device deflects the direction of the invisible light again. Accordingly, the utilization efficiency of the invisible light can be efficiently improved, so that power consumption can be reduced and touch sensitivity of the touch display device can be enhanced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention for one skilled in the art, preferred embodiments will be detailed as follows. The preferred embodiments of the present invention are illustrated in the accompanying drawings with numbered elements to elaborate the contents and effects to be achieved.

Figure 1:
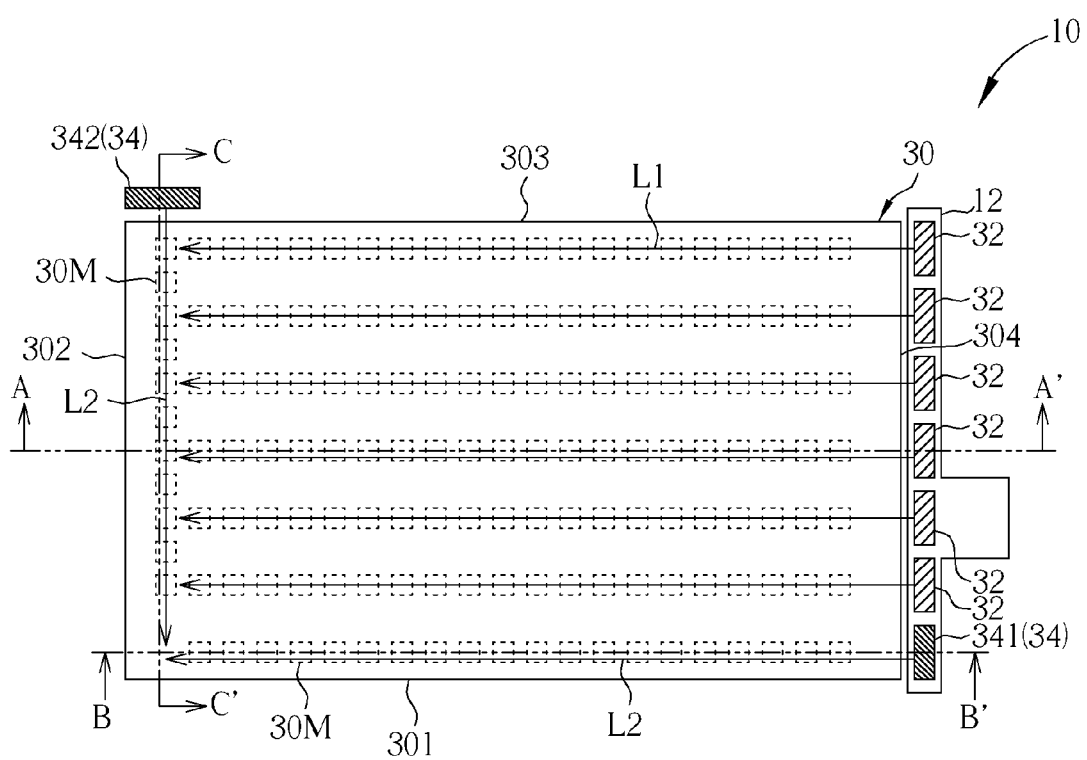
FIG. 1 through FIG. 4 are schematic diagrams illustrating a touch display device according to a first preferred embodiment of the present invention.
Figure 2:
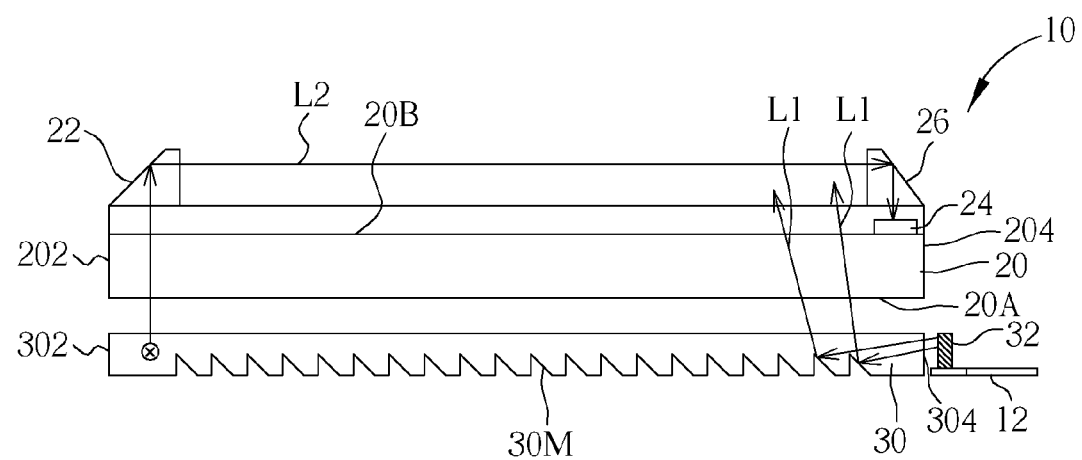
Figure 3:
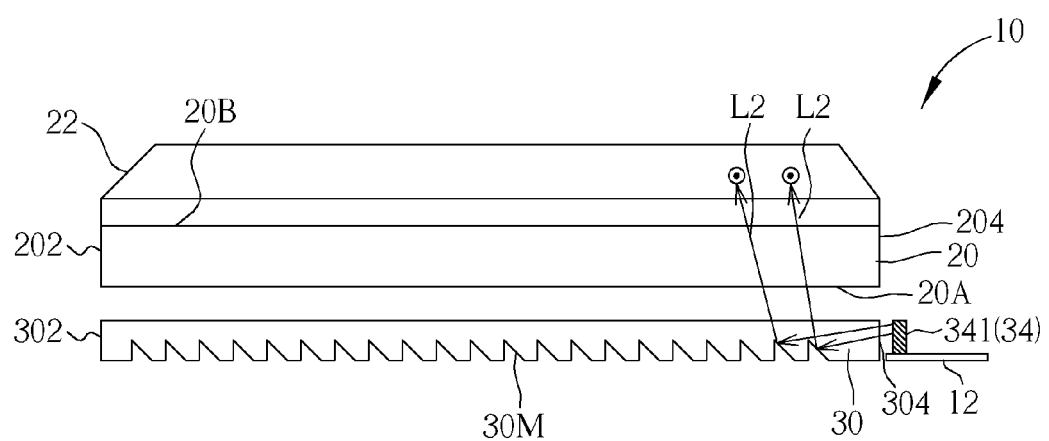
Figure 4:
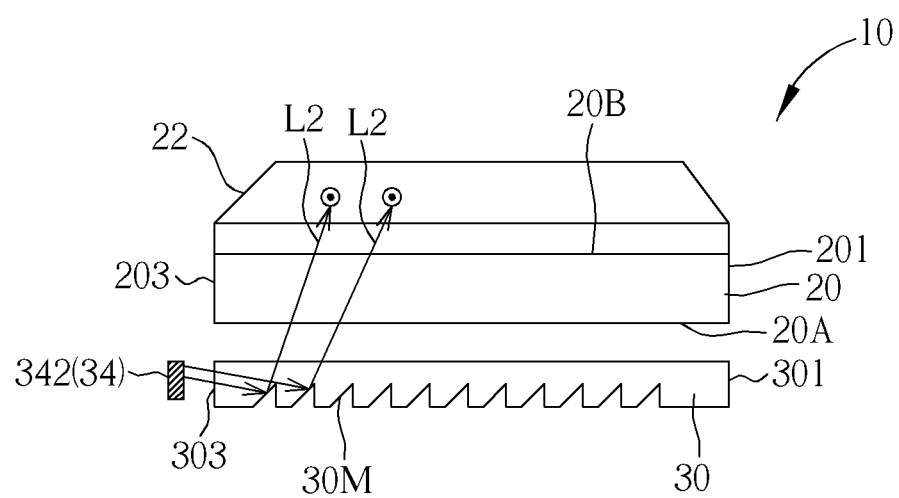

Please refer to FIG. 1 through FIG. 4, which schematically illustrate a touch display device according to a first preferred embodiment of the present invention. FIG. 1 illustrates a top view of the touch display device; FIG. 2 illustrates a cross-sectional view of the touch display device taken along line AA' shown in FIG. 1; FIG. 3 illustrates a cross-sectional view of the touch display device taken along line BB' shown in FIG. 1; and FIG. 4 illustrates a cross-sectional view of the touch display device taken along line CC' shown in FIG. 1. To distinguish the feature of the touch display device of the present invention, some components, such as display panel, of the touch display device are omitted in FIG. 1. As shown in FIG. 1 through FIG. 4, the touch display device 10 in this embodiment includes a display panel 20, a light guide plate 30, at least one visible light emitting device 32, at least one invisible light emitting device 34, a first light path converting device 22, and a plurality of photo-sensing devices 24. The display panel 20 includes a light incident plane 20A and a light exit plane 20B, and the light exit plane 20B of the display panel 20 has a first side 201, a second side 202, a third side 203, and a fourth side 204. The first side 201 and the third side 203 are respectively located on two sides opposite to each other, and the second side 202 and the fourth side 204 are respectively located on two sides opposite to each other. The light guide plate 30 faces the light incident plane 20A of the display panel 20, and the light guide plate 30 includes a first side 301, a second side 302, a third side 303, and a fourth side 304. The first side 301 and the third side 303 are respectively located on two sides opposite to each other, and the second side 302 and the fourth side 304 are respectively located on two sides opposite to each other. Locations of the first side 301, the second side 302, the third side 303, and the fourth side 304 of the light guide plate 30 respectively correspond to locations of the first side 201, the second side 202, the third side 203, and the fourth side 204 of the light exit plane 20B of the display panel 20. Therefore, the first side 301, the second side 302, the third side 303, and the fourth side 304 of the light guide plate 30 are respectively located on the same sides as the first side 201, the second side 202, the third side 203, and the fourth side 204 of the display panel 20. In this embodiment, the display panel 20 is a liquid crystal display panel, but not limited thereto. The display panel 20 also can be other types of display panels, such as electrophoresis display panel or plasma display panel, etc. Moreover, the light guide plate 30 further includes a plurality of microstructures 30M, and the microstructures 30M are correspondingly disposed on at least the first side 301 and the second side 302, but not limited thereto. In this embodiment, for example, the microstructures 30M also can be disposed throughout the light guide plate 30. That means the microstructures 30M can be locally formed on the light guide plate 30 or completely formed on the light guide plate 30. In this embodiment, each microstructure 30M forms a concavity on the lower surface of the light guide plate 30, but not limited thereto. The microstructures 30M, for example, also can have different configurations with capabilities of changing light paths.

As shown in FIG. 1 and FIG. 2, in this embodiment, the visible light emitting device 32 is disposed on at least one side of the light guide plate 30 to emit a visible light L1 toward the light guide plate 30 so as to provide a backlight source for the display panel 20. The visible light emitting device 32 can include a white light emitting device, such as a white light emitting diode device, but not limited thereto. In this embodiment, the visible light emitting device 32 is disposed on the fourth side 304 of the light guide plate 30, but not limited thereto. The visible light emitting device 32 also can be disposed on at least one of the first side 301, the second side 302, the third side 303, and the fourth side 304 of the light guide plate 30 based on requirements of brightness. As shown in FIG. 1, FIG. 3, and FIG. 4, the invisible light emitting device 34 is disposed on at least one side of the light guide plate 30 to emit an invisible light L2 toward the light guide plate 30. The invisible light emitting device 34 can be any light emitting device, such as an infrared light emitting device or a laser emitting device, capable of emitting invisible light sources but not limited thereto. In this embodiment, the invisible light emitting device 34 includes a first invisible light emitting device 341, disposed on the fourth side 304 of the light guide plate 30 to emit the invisible light L2 along the first side 301 of the light guide plate 30; and a second invisible light emitting device 342, disposed on the third side 303 of the light guide plate 30 to emit the invisible light L2 along the second side 302 of the light guide plate 30. It is noted that the first invisible light emitting device 341 and the second invisible light emitting device 342 can emit the invisible light L2 at the same time or emit the invisible light L2 in sequence. Moreover, the first light path converting device 22 is disposed on the light exit plane 20B of the display panel 20 and arranged along the first side 201 and the second side 202 of the light exit plane 20B of the display panel 20. In addition, the photo-sensing devices 24 are arranged along the third side 203 and the fourth side 204 of the light exit plane 20B of the display panel 20.

As shown in FIG. 2, the visible light source L1 emitted from the visible light emitting device 32 enters the light guide plate 30, and then the visible light source L1 is upwardly guided toward the display panel 20 by the light guide plate 30 so as to provide a backlight source for the display panel 20. In this embodiment, the visible light source L1 is upwardly deflected toward the display panel 20 by the microstructures 30M of the light guide plate 30, but not limited thereto. The visible light source L1 also can be guided toward the display panel 20 by other methods. For example, the visible light source L1 can be upwardly scattered toward the display panel 20 by scattering particles (not shown) disposed in the light guide plate 30. In an alternative embodiment, the light guide plate 30 can be modified to have an inclined lower surface so as to upwardly reflect the visible light source L1 toward the display panel 20. Moreover, in this embodiment, the microstructures 30M with triangular concavities are taken as the example for description, but not limited thereto. The microstructures 30M can be concavities with other configurations, and also the microstructures 30M can be convexities, such as semicircular convexities, triangular convexities, etc., with capabilities of guiding the visible light source L1 toward the light incident plane 20A of the display panel 20.

As shown in FIG. 3, the invisible light L2 emitted from the invisible light emitting device 34 is upwardly deflected toward the first light path converting device 22 by the microstructures 30M of the light guide plate 30. Then, the invisible light L2 is then deflected by the first light path converting device 22, so that the photo-sensing devices 24 can receive the invisible light L2. More precisely, the invisible light L2 emitted from the first invisible light emitting device 341 is guided toward the light incident plane 20A by the microstructures 30M disposed on the first side 301 of the light guide plate 30, and the invisible light L2 penetrates through the display panel 20 so as to reach the first light path converting device 22 from the light exit plane 20B. After that, the invisible light L2 is deflected by the first light path converting device 22 and travels along a direction substantially parallel to the second side 202/the fourth side 204. Thus, the invisible light L2 is received by the photo-sensing devices 24 disposed on the third side 203 of the light exit plane 20B of the display panel 20. The invisible light L2 emitted from the second invisible light emitting device 342 is guided toward the light incident plane 20A by the microstructures 30M disposed on the second side 302 of the light guide plate 30, and the invisible light L2 penetrates through the display panel 20 so as to reach the first light path converting device 22 from the light exit plane 20B. After that, the invisible light L2 is deflected by the first light path converting device 22 and travels along a direction substantially parallel to the first side 201/the third side 203. Thus, the invisible light L2 is received by the photo-sensing devices 24 disposed on the fourth side 204 of the light exit plane 20B of the display panel 20. The photo-sensing devices 24 can be bonded on the third side 203 and the fourth side 204 of the light exit plane 20B of the display panel 20, but not limited thereto. For example, in this embodiment, the photo-sensing devices 24 may bee preferably disposed in the display panel 20, i.e. the formation of the photo-sensing devices 24 may be integrated with the fabrication of other devices, such as thin film transistors, in the display panel 20 and become in-cell photo-sensing devices 24 so as to reduce the cost and the thickness of the touch display device 10. In addition, when the in-cell photo-sensing devices 24 are utilized, the touch display device 10 can further include a second light path converting device 26 (shown in FIG. 2), disposed on the light exit plane 20B of the display panel 20 and arranged along the third side 203 and the fourth side 204 of the light exit plane 20B. In other words, the second light path converting device 26 is disposed above the photo-sensing device 24. Accordingly, the invisible light L2 emitted from the invisible light emitting device 34 is upwardly deflected by the microstructures 30M of the light guide plate 30, and penetrates through the display panel 20 so as to reach the first light path converting device 22. Then, the invisible light L2 is deflected toward the second light path converting device 26 by the first light path converting device 22. Finally, the invisible light L2 is deflected toward the photo-sensing devices 24 by the second light path converting device 26, so that the photo-sensing devices 24 receive the invisible light L2.

In accordance with the embodiment as shown in FIG. 3, the microstructures 30M preferably have triangular concavities structures to guide the invisible light L2, but not limited thereto. The microstructures 30M can be other microstructures capable of guiding the invisible light L2 toward the light incident plane 20A of the display panel 20, so that the invisible light L2 can reach the first light path converting device 22. Additionally, in this embodiment, the microstructures 30M utilized to guide the visible light source L1 and the microstructures 30M utilized to guide the invisible light L2 both have the same configurations, but not limited thereto. The microstructures 30M utilized to guide the visible light source L1 and the invisible light L2 can have different configurations respectively. For example, the microstructures 30M utilized to guide the visible light source L1 can be semicircular convexities, and the microstructures 30M utilized to guide the invisible light L2 can be triangular concavities. In this case, the lower surface of the light guide plate 20 has microstructures 30M with different configurations.

The first light path converting device 22 and the second light path converting device 26 can be varieties of devices, such as internal total reflection devices, reflection devices, diffraction devices (e.g. optical gratings) of refraction devices. In this embodiment, the internal total reflection devices are utilized for the first light path converting device 22 and the second light path converting device 26. Accordingly, the invisible light L2 enters first light path converting device 22 and the second light path converting device 26, and then the invisible light L2 is deflected by internal total reflections due to differences in refractive indexes, but not limited thereto. It is noted that the touch display device 10 can further include a circuit board 12, such as a flexible circuit board. The visible light emitting device 32 and the invisible light emitting device 34 can be disposed on the circuit board 12 so as to simplify a driving method and to reduce the size of the touch display device 10.

Figure 5:
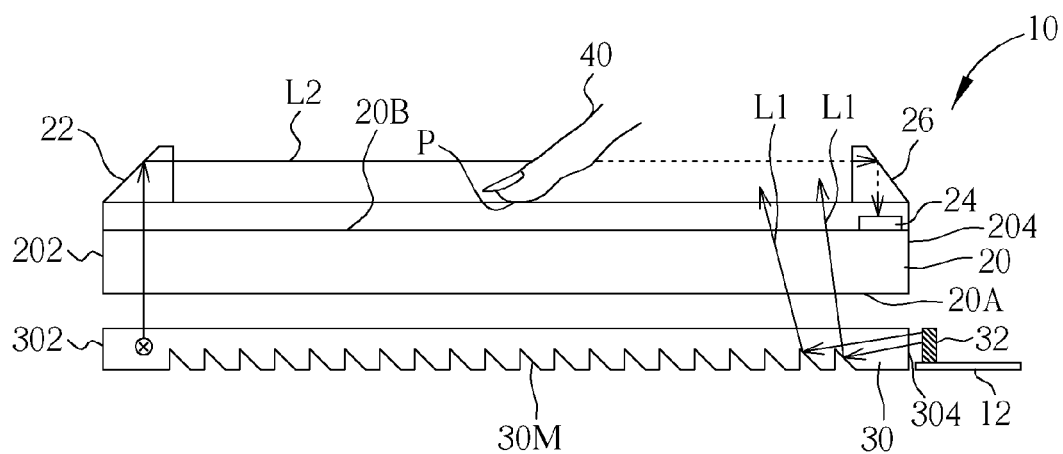
FIG. 5 is a schematic diagram illustrating the touch display device according to the preferred embodiment when being touched for data input.

Please refer to FIG. 5 and FIG. 1 through FIG. 2 as well. FIG. 5 illustrates the touch display device according to the embodiment of the present invention when being touched for data input. FIG. 5 is a cross-sectional diagram taken along line AA' shown in FIG. 1. As shown in FIG. 5, when a user uses a touch device 40, such as his finger or a touch stylus, to input data at an input point P at the surface of the touch display device 10, a part of the invisible light L2 would be blocked by the touch device 40. Meanwhile, the photo-sensing device 24 disposed on the fourth side 204 and corresponding to the input point P can not receive the invisible light L2. Thus, a horizontal coordinate of the input point P can be identified. Similarly, the photo-sensing device 24 disposed on the third side 203 and corresponding to the input point P can not receive the invisible light L2. Thus, a vertical coordinate of the input point P can be identified. As a result, the position of the input point P can be identified when the touch display device 10 is touched for data input.

It can be seen from the aforementioned description that the visible light emitting device 32 and the invisible light emitting device 34 are integrated in a backlight module of the touch display device 10, and driven by the same circuit board 12. Therefore, the size of the touch display device 10 can be efficiently reduced and power consumption can be lowered. In addition, collimation of the invisible light emitting device L2 can be increased via the microstructures 30M of the light guide plate 30 so as to eliminate crosstalk problem of touch signals. Thus, the light utilization efficiency and the touch sensitivity of the touch display device 10 can be promoted. Moreover, in the touch display device 10, the interval between adjacent microstructures 30M and the interval between adjacent photo-sensing devices 24 can be adjusted to highly promote touch accuracy and resolution. In this embodiment, for instance, the interval between adjacent photo-sensing devices 24 can be approximately 0.2 mm or less.

The touch display device of the present invention is not limited to the aforementioned embodiment. The following descriptions will introduce touch display devices according to other preferred embodiments. For the sake of clear comparison between different embodiments, identical components are denoted by identical numerals. In addition, the description mainly focuses on the differences between embodiments, and repeated aspects are not redundantly described.

Figure 6:
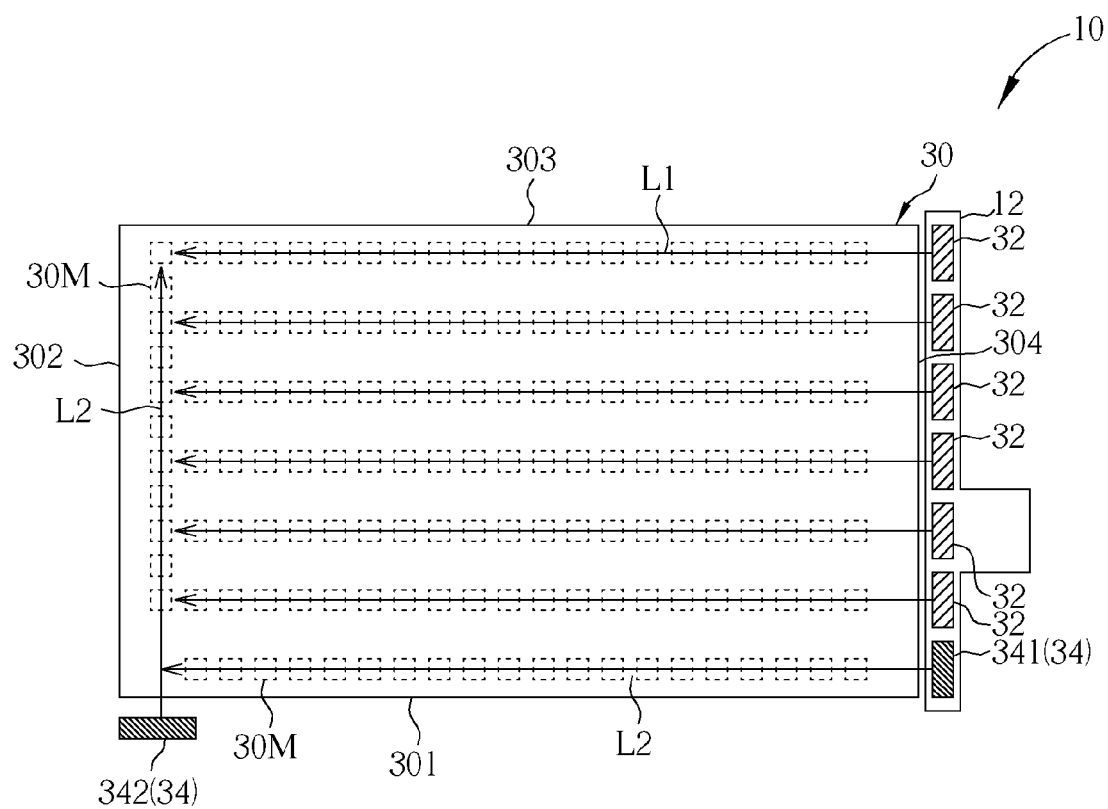
FIG. 6 through FIG. 8 are schematic diagrams illustrating touch display devices according to three variant configurations of the first preferred embodiment of the present invention.
Figure 7:
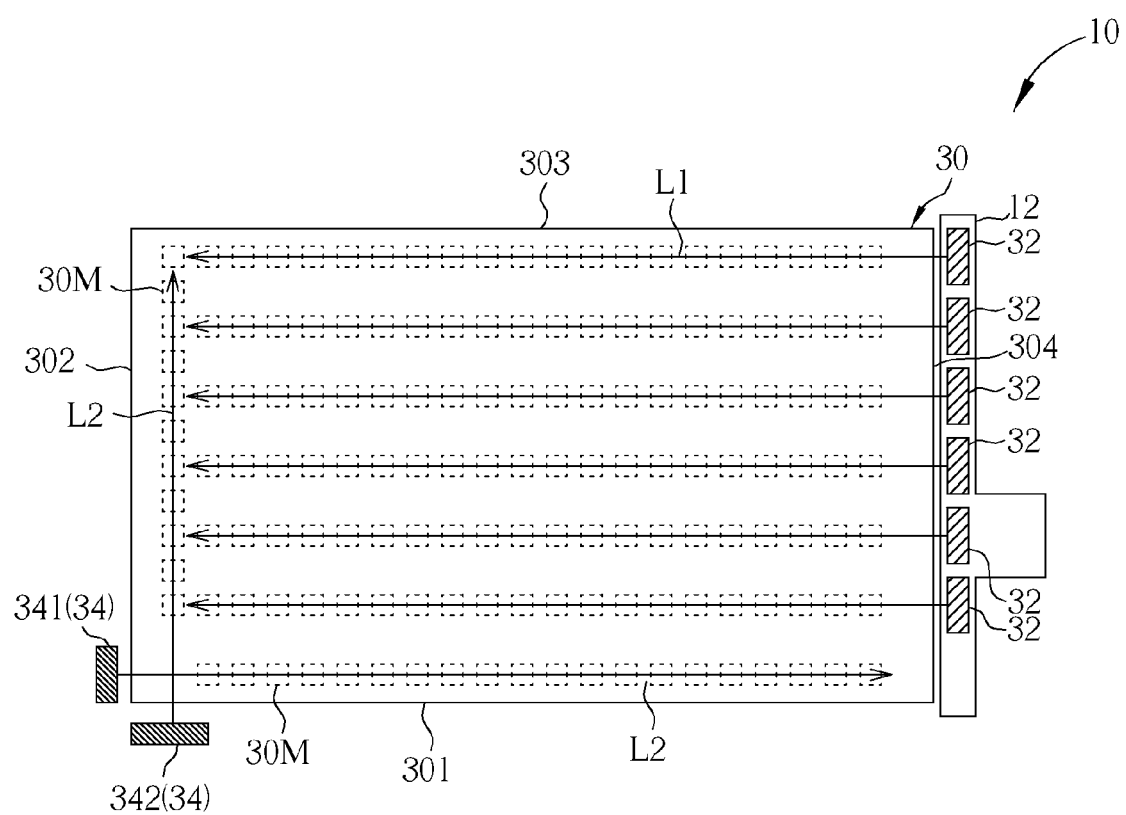
Figure 8:
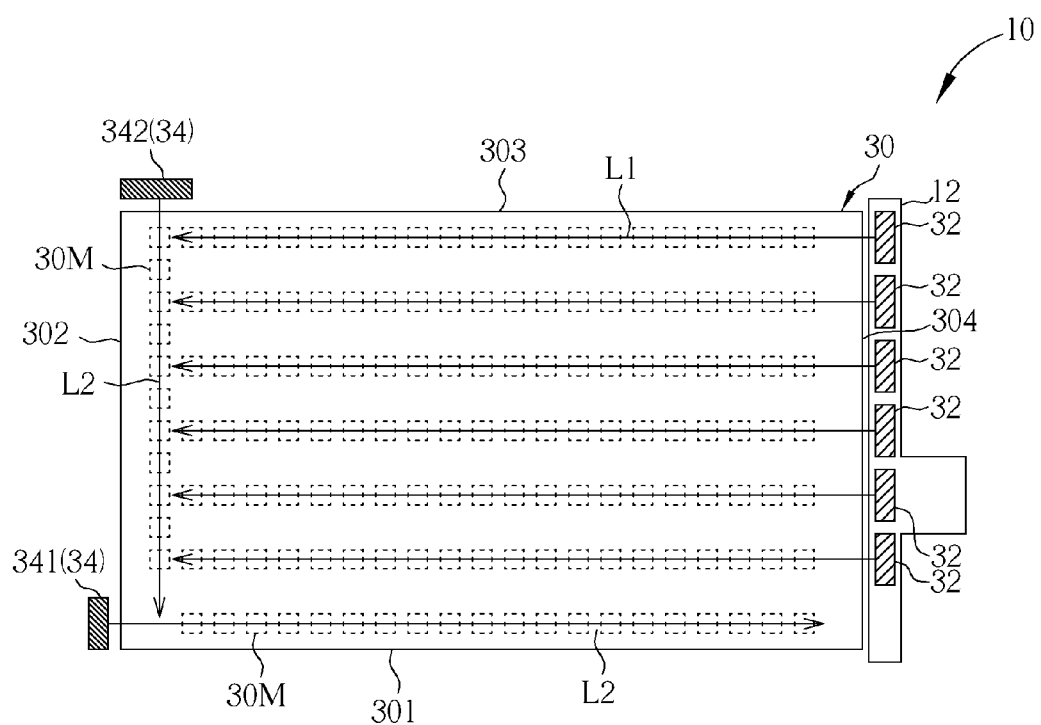

Please refer to FIG. 6 through FIG. 8, which schematically illustrate touch display devices according to three variant configurations of the first preferred embodiment of the present invention. As shown in FIG. 6, in accordance with the first variant configuration, the first invisible light emitting device 341 is disposed on the fourth side 304 of the light guide plate 30 to emit the invisible light L2 along the first side 301 of the light guide plate 30; the second invisible light emitting device 342 is disposed on the first side 301 of the light guide plate 30 to emit the invisible light L2 along the second side 302 of the light guide plate 30. As shown in FIG. 7, in accordance with the second variant configuration, the first invisible light emitting device 341 is disposed on the second side 302 of the light guide plate 30 to emit the invisible light L2 along the first side 301 of the light guide plate 30; the second invisible light emitting device 342 is disposed on the first side 301 of the light guide plate 30 to emit the invisible light L2 along the second side 302 of the light guide plate 30. As shown in FIG. 8, in accordance with the third variant configuration, the first invisible light emitting device 341 is disposed on the second side 302 of the light guide plate 30 to emit the invisible light L2 along the first side 301 of the light guide plate 30; and the second invisible light emitting device 342 is disposed on the third side 303 of the light guide plate 30 to emit the invisible light L2 along the second side 302 of the light guide plate 30.

Figure 9:
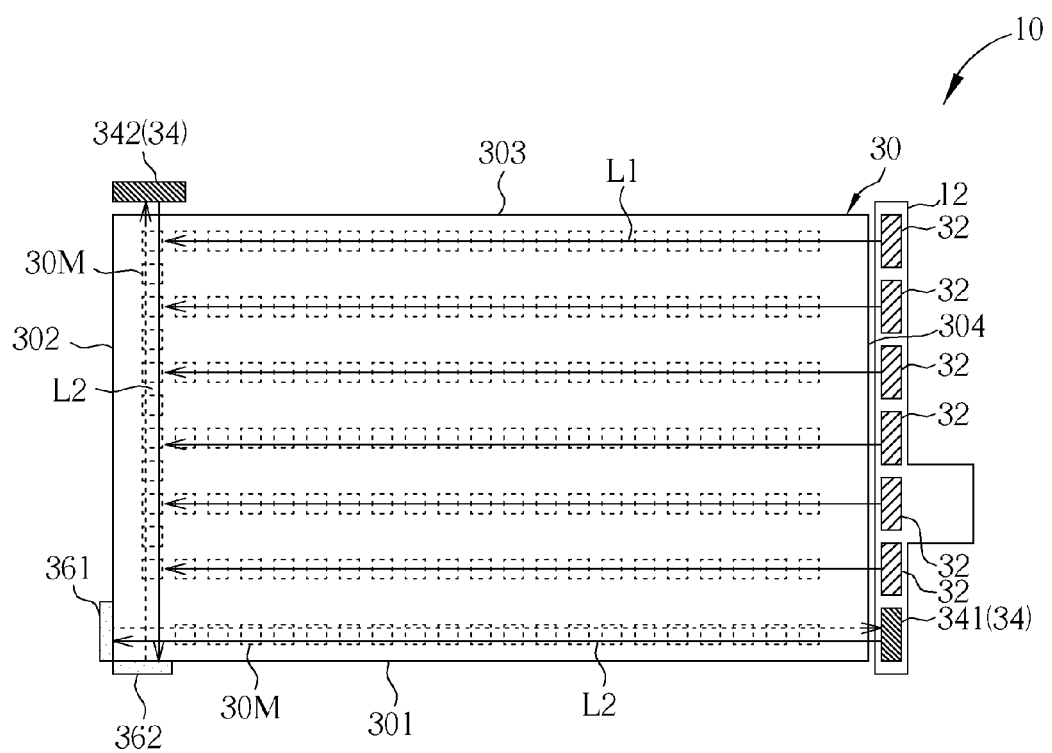
FIG. 9 through FIG. 12 are schematic diagrams illustrating touch display devices according to four variant configurations of a second preferred embodiment of the present invention.

Please refer to FIG. 9 through FIG. 12, which illustrate touch display devices according to four variant configurations of a second embodiment of the present invention. In accordance with each variant configuration of the second embodiment of the present invention, the first invisible light emitting device 341 and the second invisible light emitting device 342 are disposed at the same positions as that according to each variant configuration of the first preferred embodiment. A difference between the embodiments is that the touch display device according to the second embodiment can further include a reflective plane to improve invisible light utilization efficiency. As shown in FIG. 9, in the second embodiment, a first reflective plane 361 is disposed on the second side 302 of the light guide plate 30 to reflect the invisible light L2 emitted along the first side 301 by the first invisible light emitting device 341 disposed on the fourth side 304. Also, a second reflective plane 362 is disposed on the first side 301 of the light guide plate 30 to reflect the invisible light L2 emitted along the second side 302 by the second invisible light emitting device 342 disposed on the third side 303.

Figure 10:
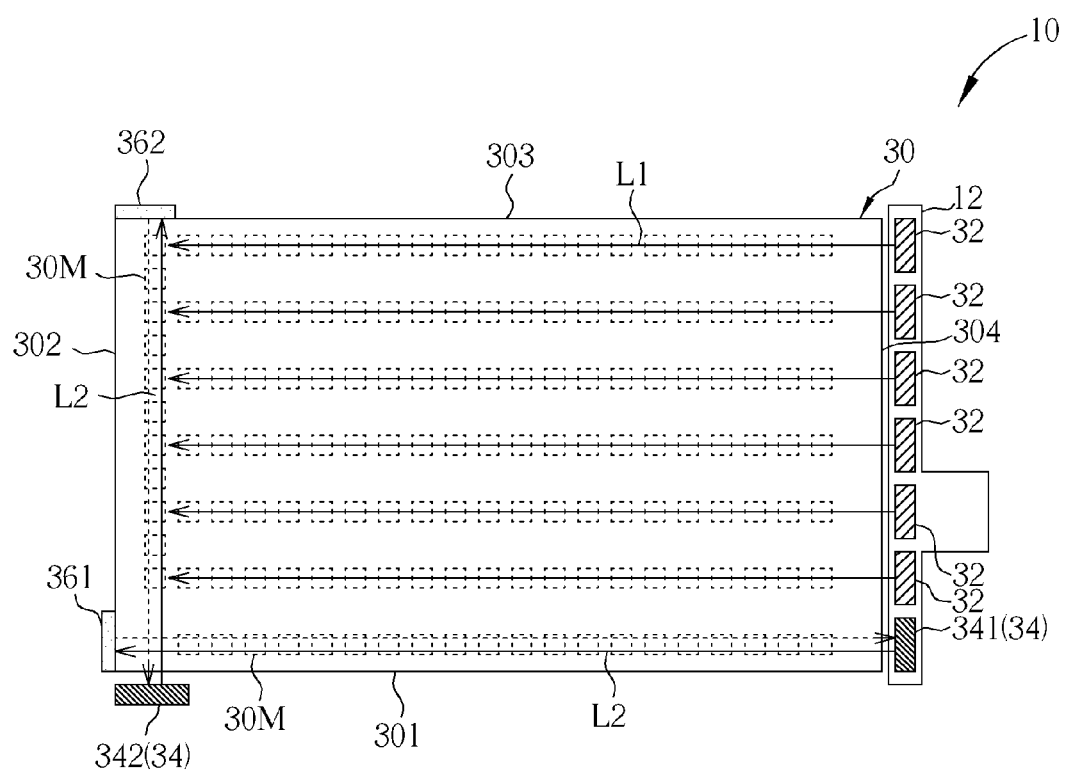

As shown in FIG. 10, in accordance with the first variant configuration, a first reflective plane 361 is disposed on the second side 302 of the light guide plate 30 to reflect the invisible light L2 emitted along the first side 301 by the first invisible light emitting device 341 disposed on the fourth side 304. Also, a second reflective plane 362 is disposed on the third side 303 of the light guide plate 30 to reflect the invisible light L2 emitted along the second side 302 by the second invisible light emitting device 342 disposed on the first side 301.

Figure 11:
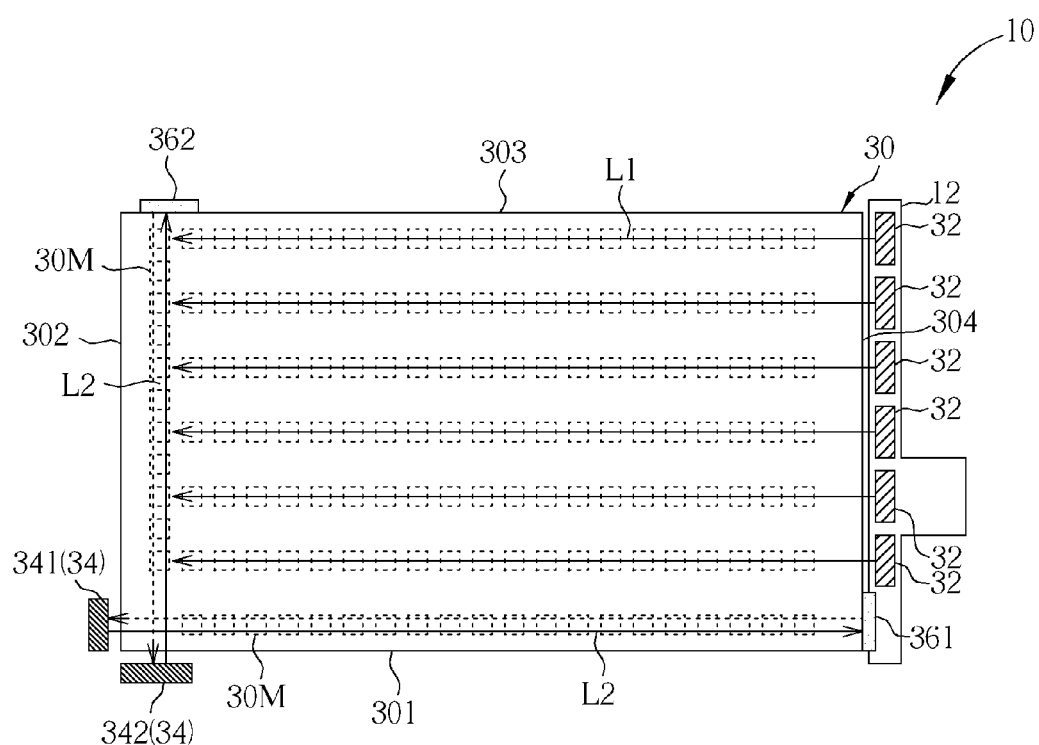

As shown in FIG. 11, in accordance with the second variant configuration, a first reflective plane 361 is disposed on the fourth side 304 of the light guide plate 30 to reflect the invisible light L2 emitted along the first side 301 by the first invisible light emitting device 341 disposed on the second side 304. Also, a second reflective plane 362 is disposed on the third side 303 of the light guide plate 30 to reflect the invisible light L2 emitted along the second side 302 by the second invisible light emitting device 342 disposed on the first side 301.

Figure 12:
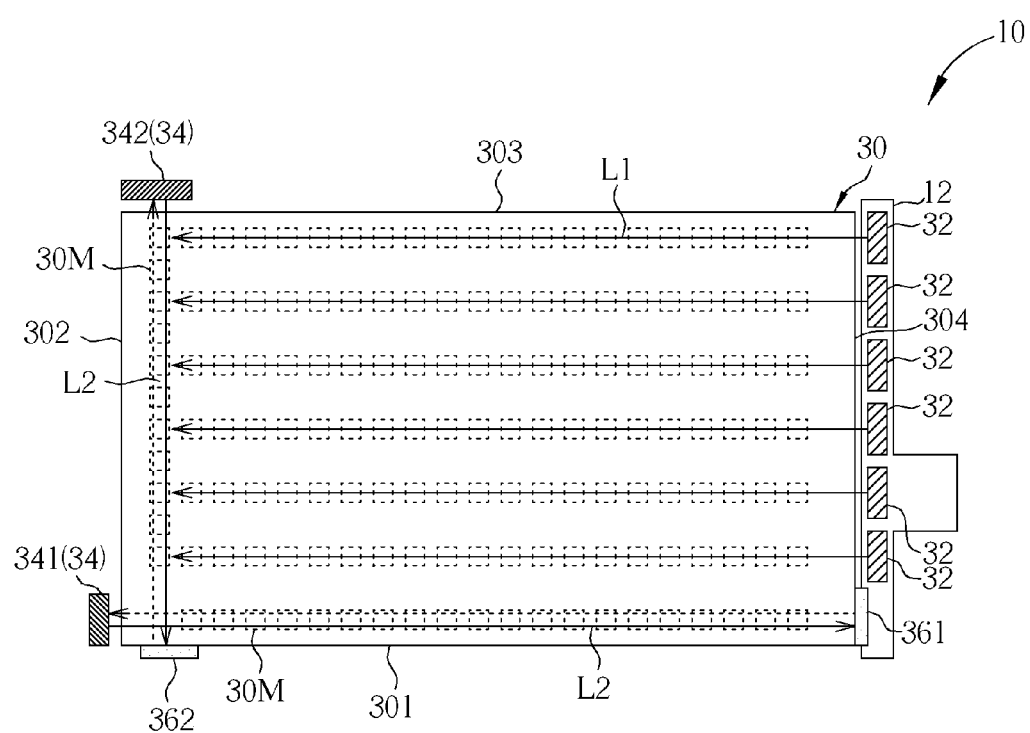

As shown in FIG. 12, in accordance with the third variant configuration, a first reflective plane 361 is disposed on the fourth side 304 of the light guide plate 30 to reflect the invisible light L2 emitted along the first side 301 by the first invisible light emitting device 341 disposed on the second side 302. Also, a second reflective plane 362 is disposed on the first side 301 of the light guide plate 30 to reflect the invisible light L2 emitted along the second side 302 by the second invisible light emitting device 342 disposed on the third side 303.

Figure 13:
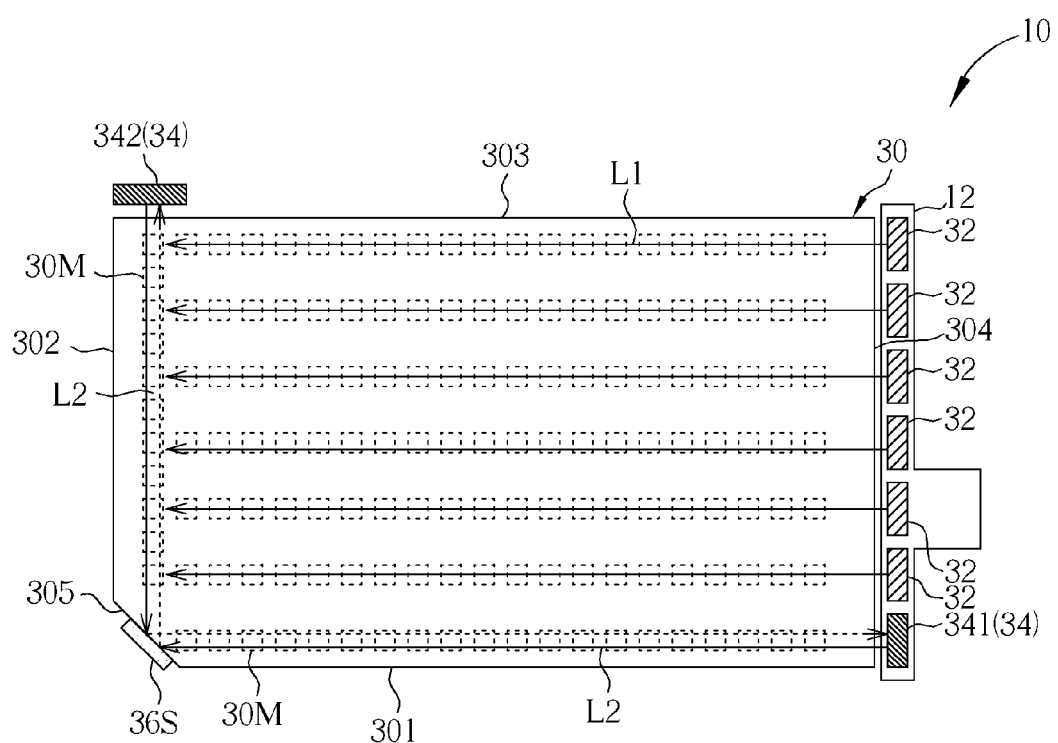
FIG. 13 is a schematic diagram illustrating a touch display device according to a third preferred embodiment of the present invention.

As shown in FIG. 13, which schematically illustrates a touch display device according to a third embodiment of the present invention. As shown in FIG. 13, in this embodiment, the light guide plate 30 further includes a fifth side 305. The fifth side 305 of the light guide plate 30 is located between the first side 301 and the second side 302 of the light guide plate 30. The fifth side 305 and first side 301 have a non-right included angle, and also the fifth side 305 and second side 302 have a non-right included angle. In other words, the fifth side 305 is disposed obliquely with respect to the first side 301 and the second side 302, respectively. In addition, the light guide plate 30 further includes an inclined reflective plane 36S disposed on the fifth side 305. The inclined reflective plane 36S is used to reflect the invisible light L2 emitted along the first side 301 by the first invisible light emitting device 341 disposed on the fourth side 304, so that the invisible light L2 is deflected and travels along the second side 302. Also the inclined reflective plane 36S can reflect the invisible light L2 emitted along the second side 302 by the second invisible light emitting device 342 disposed on the third side 303, so that the invisible light L2 is deflected and travels along the first side 302. As a result, the utilization efficiency of the invisible light L2 can be improved.

Figure 14:
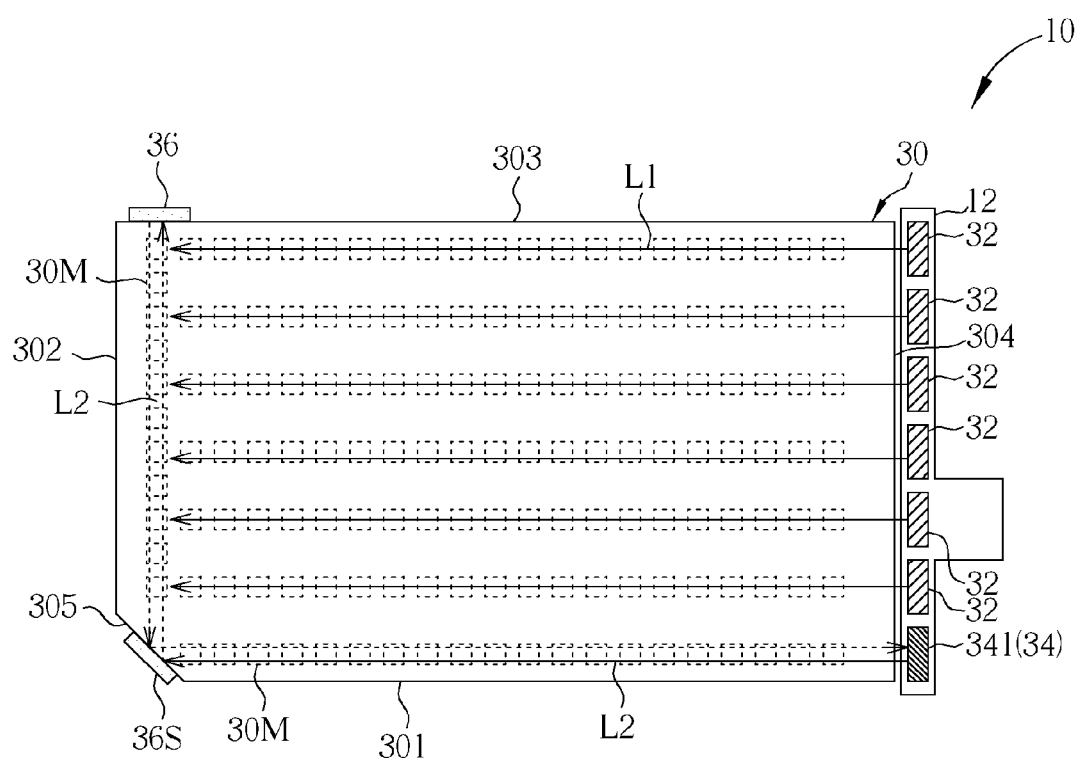
FIG. 14 is a schematic diagram illustrating a touch display device according to a fourth preferred embodiment of the present invention.

Please refer to FIG. 14, which schematically illustrates a touch display device according to a fourth preferred embodiment of the present invention. As shown in FIG. 14, in this embodiment, the first invisible light emitting device 341 is only disposed on the fourth side 304 of the light guide plate 30. The light guide plate 30 further includes an inclined reflective plane 36S disposed on the fifth side 305. The inclined reflective plane 36S is used to reflect the invisible light L2 emitted along the first side 301 by the first invisible light emitting device 341 disposed on the fourth side 304, so that the invisible light L2 is deflected and travels along the second side 302. In addition, the light guide plate 30 includes a reflective plane 36 disposed on the third side 303. The reflective plane 36 is used to reflect the invisible light L2 coming from the inclined reflective plane 36S so as to improve the utilization efficiency of the invisible light L2. In accordance with another variant configuration of this embodiment, the reflective plane 36 disposed on the third side 303 can be omitted. In this case, only the inclined reflective plane 36S disposed on the fifth side 305 is used to guide the invisible light L2 emitted from the first invisible light emitting device 341, so that the invisible light L2 traveling along the first side 301 can be guided toward the second side 302 by the inclined reflective plane 36S. Moreover, the inclined reflective plane 36S also can be omitted. In this case, only the fifth side 305, having the inclined reflective plane, of the light guide plate 30 can be used to guide the invisible light L2 toward the second side 302. According to the aforementioned embodiment, only fifth side 305 is used to guide the invisible light L2 toward the first side 301 and the second side, but not limited thereto. The reflective plane can be disposed at other locations based on different requirements.

Figure 15:
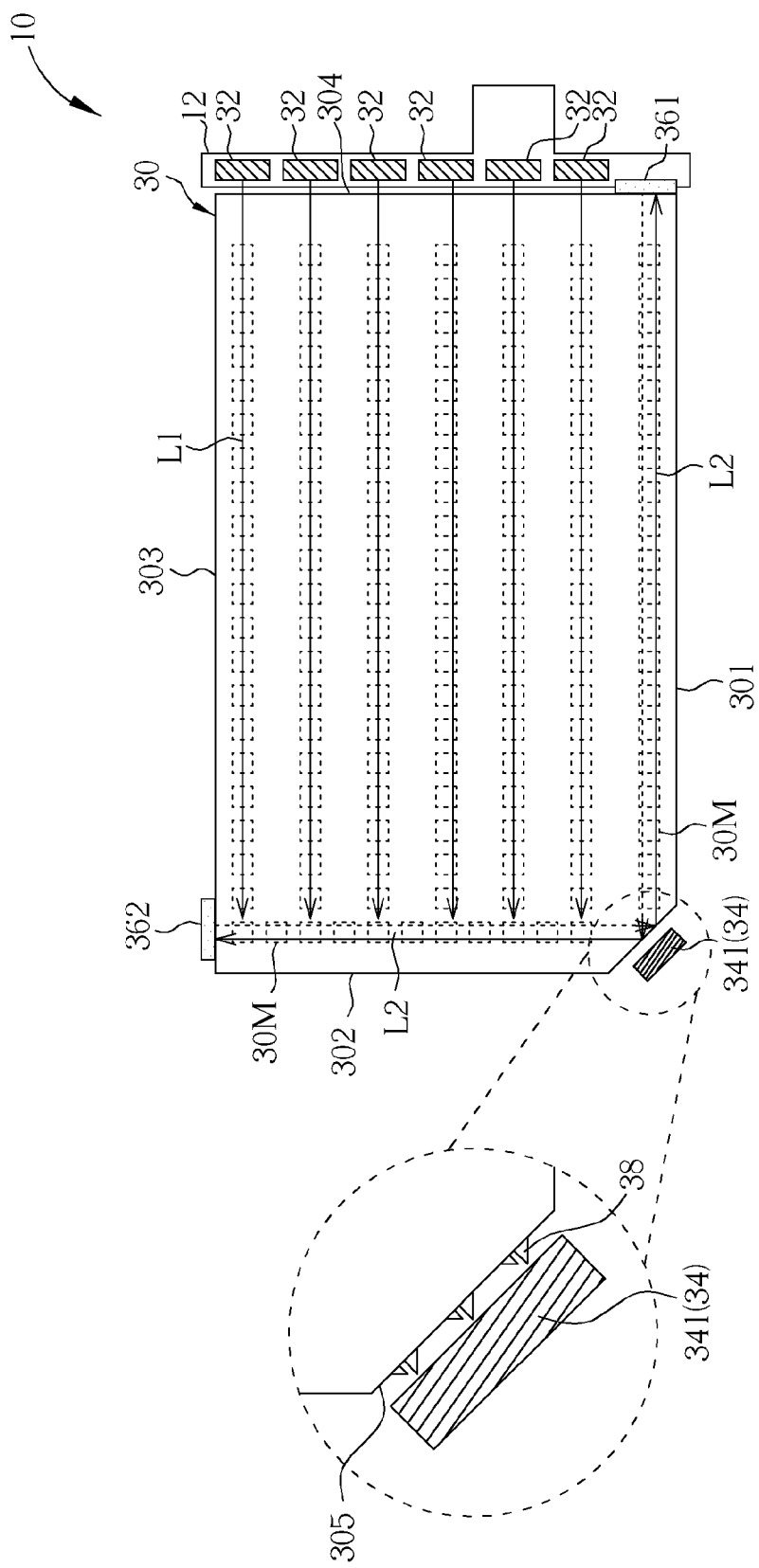
FIG. 15 is a schematic diagram illustrating a touch display device according to a fifth preferred embodiment of the present invention.

Please refer to FIG. 15, which schematically illustrates a touch display device according to a fifth embodiment of the present invention. As shown in FIG. 15, in this embodiment, the first invisible light emitting device 341 is disposed on the fifth side 305 of the light guide plate 30, and the touch display device 10 further includes a light splitting device 38, disposed between the first invisible light emitting device 341 and the light guide plate 30. The invisible light L2 emitted from the first invisible light emitting device 341 is split by the light splitting device 38 and travels along both the first side 301 and the second side 302 of the light guide plate 30. Moreover, the fourth side 304 and the third side 303 of the light guide plate 30 have a first reflective plane 361 and a second reflective plane 362 respectively so as to improve the utilization efficiency of the invisible light L2. In another embodiment, either the first reflective plane 361 disposed on the fourth side 304 or the second reflective plane 362 disposed on the third side 303, can be omitted, or both the first reflective plane 361 and the second reflective plane 362 can be omitted. In this embodiment, the invisible light L2 emitted from the first invisible light emitting device 341 disposed on the fifth side 305 still can be split by the light splitting device 38 to travel along both the first side 301 and the second side 302.

Figure 16:
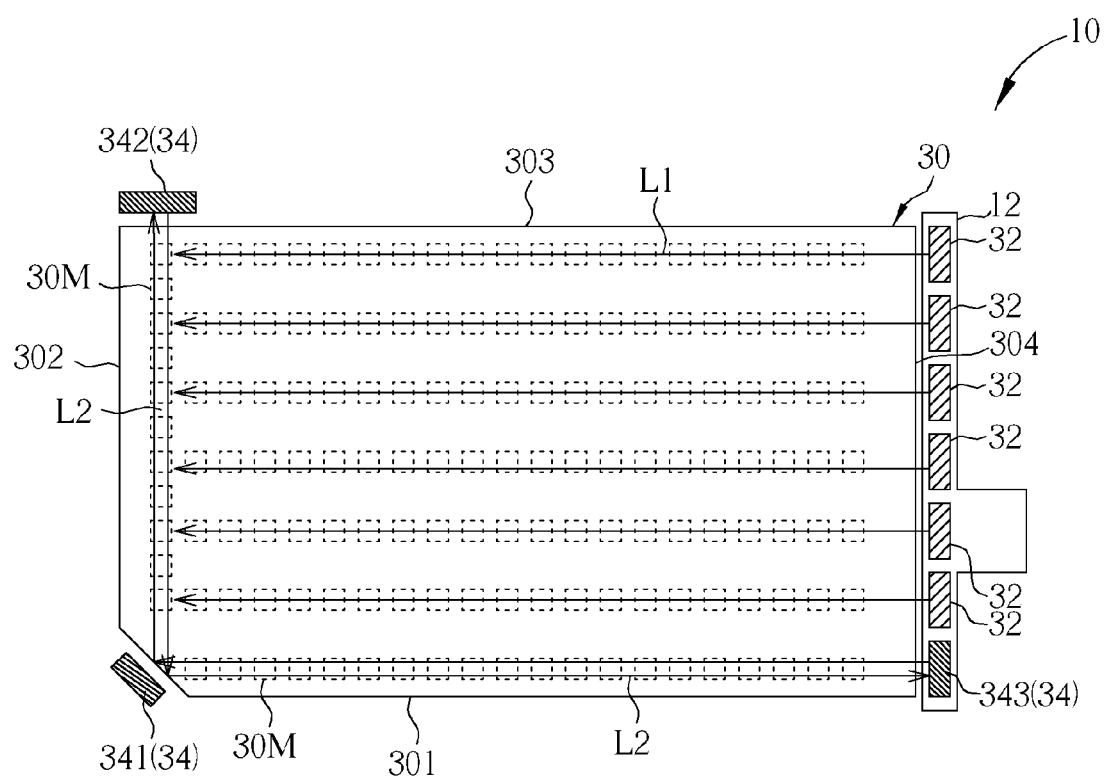
FIG. 16 is a schematic diagram illustrating a touch display device according to a sixth preferred embodiment of the present invention.

Please refer to FIG. 16, which schematically illustrates a touch display device according to a sixth embodiment of the present invention. As shown in FIG. 16, in this embodiment, the invisible light emitting device 34 includes a first invisible light emitting device 341, a second invisible light emitting device 342, and a third invisible light emitting device 343. The first invisible light emitting device 341 is disposed on the fifth side 305 of the light guide plate 30 to emit the invisible light L2. The invisible light L2 is split by the light splitting device (not shown) and thus emitted along both the first side 301 and the second side 302; the second invisible light emitting device 342 is disposed on the third side 303 of the light guide plate 30 to emit the invisible light L2 along the second side 302; and the third invisible light emitting device 343 is disposed on the fourth side 304 of the light guide plate 30 to emit the invisible light L2 along the first side 301.

Figure 17:
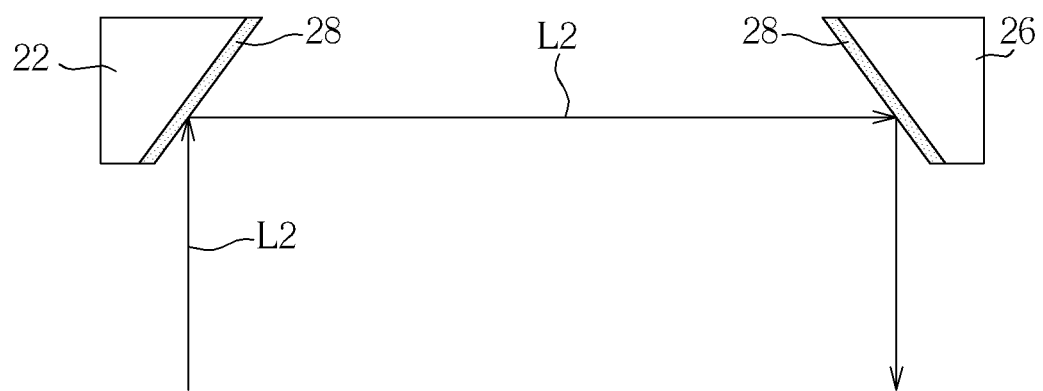
FIG. 17 is a schematic diagram illustrating a first light path converting device and a second light path converting device according to another embodiment of the present invention.

Please refer to FIG. 17, which schematically illustrates the first light path converting device and the second light path converting device according to another embodiment of the present invention. As shown in FIG. 17, in this embodiment, the first light path converting device 22 and the second light path converting device 26 can respectively be a reflection device made of a material with high reflectivity or a reflection device having a reflective film 28 so as to deflect the invisible light L2. The reflective film 28 can be varieties of films, such as metal film, capable of reflecting light. Also, the first light path converting device 22 and the second light path converting device 26 can be other devices, such as refraction devices or diffraction devices, capable of changing light paths.

To sum up, the touch display device of the present invention integrates the visible light emitting device and the invisible light emitting device in the backlight module. The visible light emitting device is used to provide a light source for the display panel, and the invisible light emitting device is used for optical touch input. The visible light emitting device and the invisible light emitting device can be driven by the same circuit board, so that the size of the touch display device can be effectively reduced, and the power consumption can be lowered. In addition, the collimation of the visible light emitting device can be improved via the microstructures of the light guide plate, so that touch performance can be promoted. Moreover, the interval between adjacent microstructures and the interval between adjacent photo-sensing devices can be adjusted to highly promote touch accuracy and resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display device, comprising:
   a display panel, having a light incident plane and a light exit plane, wherein the light exit plane has a first side, a second side adjacent to the first side, a third side opposite to the first side, and a fourth side opposite to the second side;
   a light guide plate, disposed at the light incident plane, wherein the light guide plate has a first side, a second side, a third side opposite to the first side, and a fourth side opposite to the second side, the first side, the second side, the third side, and the fourth side of the light guide plate correspond to the first side, the second side, the third side, and the fourth side of the light exit plane of the display panel respectively, so that the first side, the second side, the third side, and the fourth side of the light guide plate are located on the same sides as the first side, the second side, the third side, and the fourth side of the light exit plane of the display panel respectively, and the light guide plate further comprises a plurality of microstructures disposed on a bottom surface of the light guide plate;
   at least one invisible light emitting device, disposed on at least one side of the light guide plate to emit an invisible light toward the light guide plate; and
   a first light path converting device, disposed on the light exit plane and arranged along the first side and the second side of the light exit plane, wherein the invisible light emitted from the invisible light emitting device travels along the first side and the second side of the light guide plate, and the invisible light is guided toward the light incident plane by the microstructures, and penetrates through the display panel so as to reach the first light path converting device.

2. The touch display device according to claim 1, wherein the first light path converting device comprises a reflection device, a total internal reflection device, a diffraction device or a refraction device.

3. The touch display device according to claim 1, further comprising a plurality of photo-sensing devices arranged along the third side and the fourth side of the light exit plane of the display panel, wherein the invisible light emitted from the invisible light source emitting device is deflected by the first light path converting device so that the photo-sensing devices receive the invisible light source.

4. The touch display device according to claim 3, wherein the photo-sensing devices are disposed inside the display panel.

5. The touch display device according to claim 4, further comprising a second light path converting device disposed on the light exit plane to arrange along the third side and the fourth side of the light exit plane, wherein the second light path converting device deflects the invisible light coming from the first light path converting device, so that the photo-sensing devices receive the invisible light.

6. The touch display device according to claim 5, wherein the second light path converting device comprises a reflection device, a total internal reflection device, a diffraction device or a refraction device.

7. The touch display device according to claim 1, wherein the at least one invisible light emitting device comprises a first invisible light emitting device and a second invisible light emitting device, wherein the first invisible light emitting device is disposed on the fourth side or the second side of the light guide plate to emit the invisible light along the first side of the light guide plate; the second invisible light emitting device is disposed on the third side or the first side of the light guide plate to emit the invisible light along the second side of the light guide plate.

8. The touch display device according to claim 7, wherein the light guide plate further comprises a first reflective plane and a second reflective plane, wherein the first reflective plane is disposed on another side opposite to the first invisible light emitting device, and the second reflective plane is disposed on another side opposite to the second invisible light emitting device.

9. The touch display device according to claim 1, wherein the light guide plate further comprises a fifth side, wherein the fifth side is located between the first side and the second side of the light guide plate, the fifth side and the first side has a non-right included angle, and the fifth side and the second side has a non-right included angle.

10. The touch display device according to claim 9, wherein the light guide plate further comprises an inclined reflective plane disposed on the fifth side.

11. The touch display device according to claim 10, wherein the at least one invisible light emitting device comprises a first invisible light emitting device disposed on the fourth side of the light guide plate to emit the invisible light toward the inclined reflective plane along the first side.

12. The touch display device according to claim 11, wherein the third side of the light guide plate has a reflective plane to reflect the invisible light traveling along the second side of the light guide plate.

13. The touch display device according to claim 11, wherein the at least one invisible light emitting device further comprises a second invisible light emitting device disposed on the third side of the light guide plate to emit the invisible light toward to the inclined reflective plane along the second side of the light guide plate.

14. The touch display device according to claim 13, wherein the first invisible light emitting device and the second invisible light emitting device emit the invisible light in sequence.

15. The touch display device according to claim 9, wherein the at least one invisible light emitting device comprises a first invisible light emitting device disposed on the fifth side of the light guide plate, and the touch display device further comprises a light splitting device disposed between the first invisible light emitting device and the light guide plate, wherein the invisible light emitted from the first invisible light emitting device is split to travel along both the first side and the second side of the light guide plate.

16. The touch display device according to claim 15, wherein a first reflective plane is disposed on the fourth side of the light guide plate to reflect the invisible light traveling along the first side of the light guide plate; and a second reflective plane is disposed on the third side of the light guide plate to reflect the invisible light traveling along the second side of the light guide plate.

17. The touch display device according to claim 15, wherein the at least one invisible light emitting device further comprises a second invisible light emitting device and a third invisible light emitting device, wherein the second invisible light emitting device is disposed on the third side of the light guide plate to emit the invisible light along the second side of the light guide plate; and the third invisible light emitting device is disposed on the fourth side of the light guide plate to emit the invisible light along the first side of the light guide plate.

18. The touch display device according to claim 17, wherein the first invisible light emitting device, the second invisible light emitting device, and the third invisible light emitting device emit the invisible light in sequence.

19. The touch display device according to claim 1, wherein the microstructures is completely or locally disposed on a lower surface of the light guide plate facing the display panel.

20. The touch display device according to claim 1, further comprising at least one visible light emitting device disposed on at least one side of the light guide plate.

\* \* \* \* \*